Sept. 12, 1950  A. B. REEVES  2,521,947
ARTICLE WORKING APPARATUS
Filed Nov. 16, 1945  2 Sheets-Sheet 1
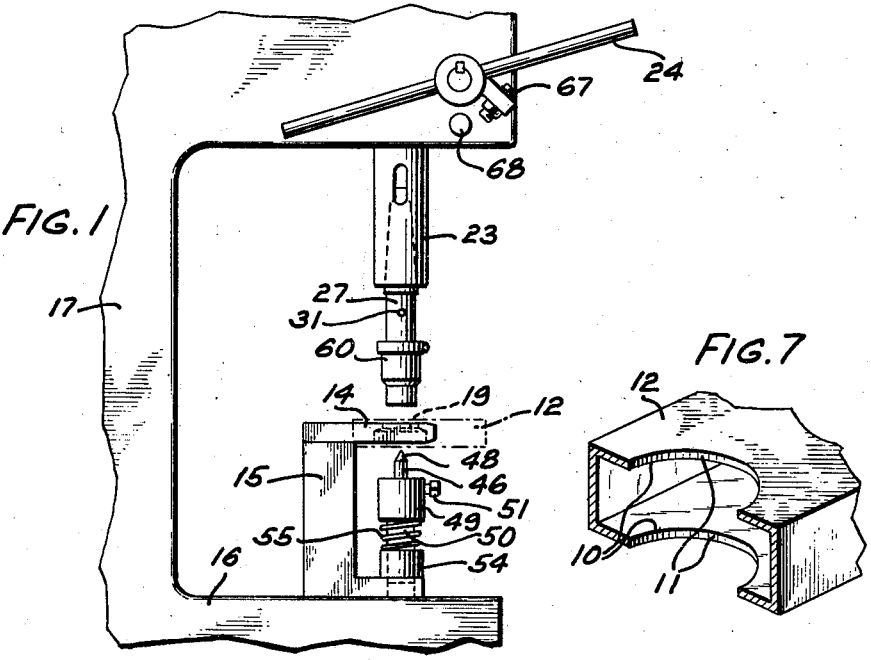
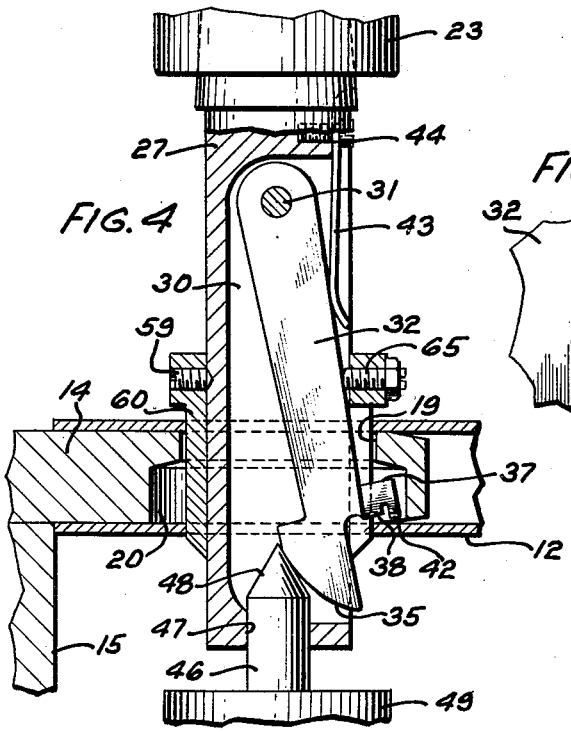
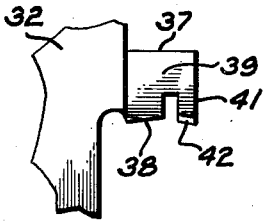
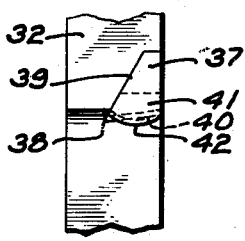
INVENTOR
A. B. REEVES
BY E. F. Kane
ATTORNEY Sept. 12, 1950     A. B. REEVES     2,521,947
ARTICLE WORKING APPARATUS
Filed Nov. 16, 1945     2 Sheets-Sheet 2
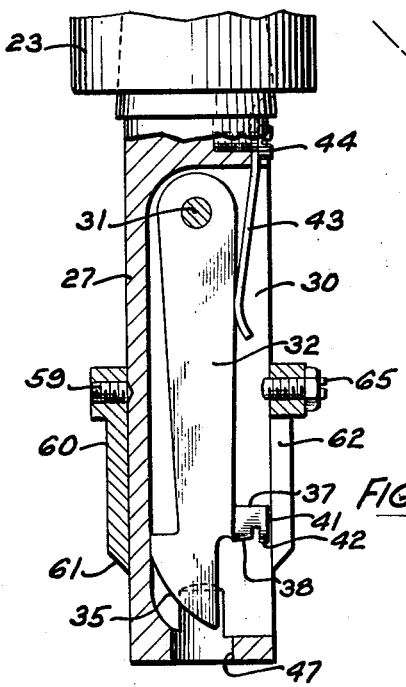
FIG. 2
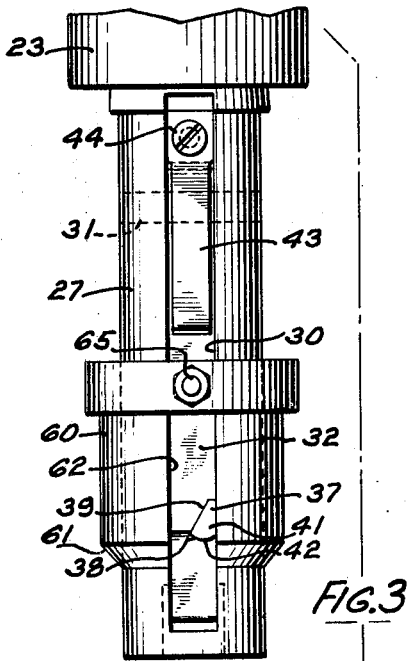
FIG. 3
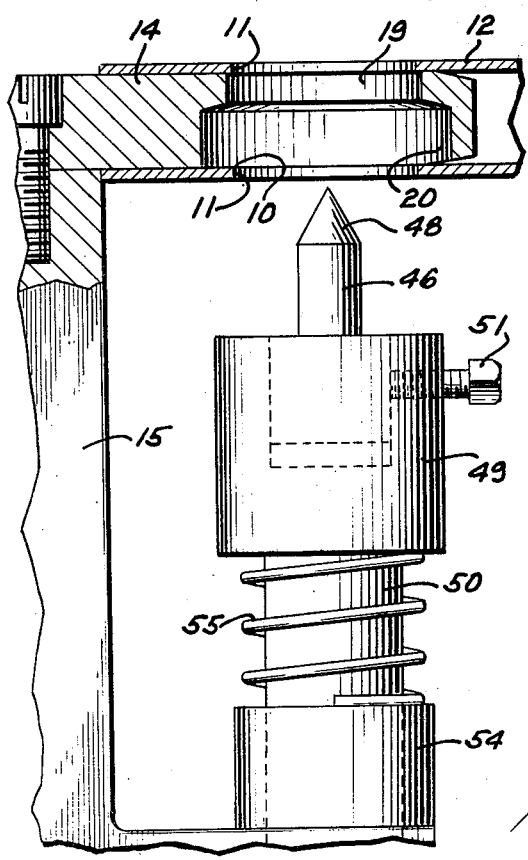
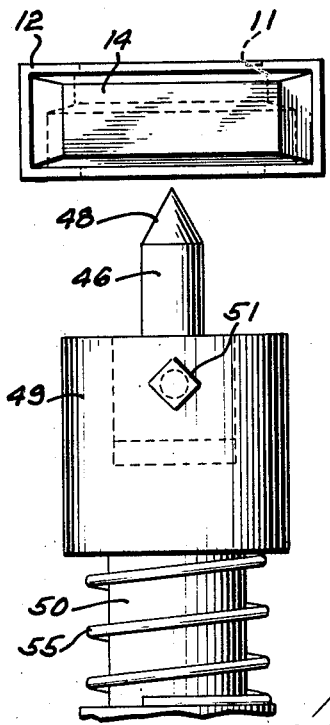
INVENTOR
A. B. REEVES
BY E. F. Kane
ATTORNEY Patented Sept. 12, 1950

2,521,947

UNITED STATES PATENT OFFICE 2,521,947

ARTICLE WORKING APPARATUS

Alexander B. Reeves, Chicago, Ill., assignor to Western Electric Company, Incorporated, New York, N. Y., a corporation of New York Application November 16, 1945, Serial No. 629,165

10 Claims. (Cl. 77—73.5)

This invention relates to an article working apparatus and more particularly to an apparatus having an expansible cutting tool for chamfering inner edges of apertures in hollow articles.

An object of this invention is to provide an improved article working apparatus for forming internal chamfers.

In one embodiment of the invention, the apparatus is provided with a rotatable, axially movable, recessed arbor, in the recess of which is mounted a pivoted cutting tool normally retained in an inoperative position. The arbor and tool are adapted to move into aligned apertures of a hollow article and to cooperate with a yieldable cam member mounted in the path of the tool to engage and move the tool radially outwardly to an operative position, where it is effective to engage and chamfer the inner edge of the lower aperture of the article.

The invention will be more fully understood from the following description when considered in conjunction with the appended drawings, in which Fig. 1 is a fragmentary side elevational view of a drilling machine showing the invention applied thereto;

Fig. 2 is an enlarged side elevational view of a portion of the apparatus with parts in section and showing the arbor in its upper position with the tool therein in its normal inoperative position and also showing an article positioned on a supporting mandrel;

Fig. 3 is a front elevational view of the structure shown in Fig. 2;

Fig. 4 is a fragmentary vertical sectional view of the apparatus showing the arbor in an intermediate lower position and the tool carried thereby engaging the cam member and having been moved into its operative position;

Fig. 5 is an enlarged fragmentary front elevational view of a portion of the tool;

Fig. 6 is a side view of Fig. 5; and

Fig. 7 is a fragmentary view in perspective of a portion of the hollow article.

In the embodiment selected to illustrate the invention, the expansible article working device is adapted to chamfer the inner edges 10 of aligned apertures 11—11 in the opposite walls of the hollow rectangular tubular member 12 (Fig. 7).

The hollow article 12 is positioned on a stationary rectangular mandrel 14, which is secured to a supporting member 15 mounted on the table 16 of a drill press 17 (Fig. 1). The mandrel 14 is provided with an aperture 19, the lower portion of which is enlarged, as indicated at 20, and the axis of which is disposed at a predetermined distance from the supporting member 15. The mandrel is mounted on the table of the drill press 17 so that the axis of the aperture 19 therein is in coaxial alignment with a spindle 23 of the drill press. The article 12 having the apertures 11 located a predetermined distance from its end, is positioned on the mandrel with the end thereof abutting against the supporting member 15, which stops the article 12 so that the apertures 11 therein are in substantial coaxial alignment with the aperture 19 in the mandrel and with the spindle 23.

The spindle 23 is vertically reciprocable under the control of an actuating lever or handle 24 and is rotated in a conventional manner by means not shown. The lower end of the spindle 23 is provided with a tapered socket to receive the shank of a tool holder arbor 27, the lower end of which is normally spaced above the mandrel 14. An elongated slot 30 is formed in the lower portion of the arbor 27 and extends inwardly from one side thereof, as indicated in Figs. 2 and 4, to receive a tool 32 pivotally mounted at its upper end on a pin 31. The tool 32 is provided with a laterally projecting portion 37 which has a cutting edge 38 formed by the inclined surfaces 39 and 40. The outer portion of the projection 37 forms a stop member 41 having a curved surface 42 for engaging the inner surface of the article 12 and limiting the downward movement of the tool. In its normal inoperative position, as indicated in Fig. 2, the tool 32 is wholly within the slot 30 of the arbor 27 and is urged to its normal position by a leaf spring 43 secured to the arbor by a screw 44.

The tool 32 which, during the operation of the device, moves downward with the arbor 27 into the apertures in the article 12 and the mandrel 14, is held in its normal inoperative position by spring 43 until it passes through the aperture 11 in the upper wall of the article, whereupon it is adapted to be cammed laterally outwardly to its operative position where the cutting edge 38 thereon is effective to engage and chamfer the inner edge of the aperture 11 in the lower wall of the article and remove the burrs therefrom. To this end, the tool 32 is provided with a curved cam face 35, which is located on the lower end of the tool 32 at a substantial distance below the cutting edge 38 and which is adapted to engage and be cammed laterally by a cooperating cam member 46. The lower end of the arbor 27 is centrally apertured at 47 to provide access to the cam surface 35 of the tool 32 by the cam member 46.

The cam member 46 is mounted in coaxial alignment with the spindle 23, beneath and in spaced relation to the mandrel 14 to permit an article 12 to be positioned on and removed from the mandrel. The cooperating cam member 46, which has a conical end 48 for engaging the cam face 35 of the tool 32, is adjustably mounted in an enlarged end 49 of a post 50 and is secured in adjusted position therein by a set screw 51. The post 50 is yieldingly mounted for vertical movement in a boss 54 formed in the base of the supporting member 15 and is held in its normal upper position by a coil spring 55, which has a predetermined free length and is interposed between the boss 54 and the enlarged end 49 of the post 50.

Secured to the arbor 27 by means of a set screw 59 is a gauge or sleeve member 60 having a tapered lower end 61 and a vertical slot 62 therein to accommodate the movement of the tool 32. The gauge 60 is adapted to fit into the apertures 11 of the article 12 and accurately position the article relative to the axis of the spindle. A set screw 65, adjustably carried by the upper portion of the gauge 50 and extending into the slot 30, serves as a stop to limit the outward movement of the tool 32 when the tool 32 is moved radially outwardly by the cam member 46. The gauge 60 is replaceable by other gauges having various outside diameters to accommodate articles having apertures of various sizes therein.

In the operation of the device, the article 12 is positioned on the mandrel 14 so that the end of the article abuts the supporting member 15, which positions the article so that the apertures 11 therein are in substantial coaxial alignment with the spindle 23. Assuming the spindle to be rotating, the operator, through the action of the lever 24, may move the spindle 23 and the parts carried thereby downward. In its downward movement, the arbor 27, the gauge member 60 and the tool 28 will pass into the aperture 19 in the mandrel 14 and the upper and lower apertures 11 in the article 12, the gauge acting to accurately align the apertures 11 of the article relative to the axis of the spindle. When the arbor 27 has reached a predetermined position during its downward movement, the cam face 35 of the tool 32 will engage the conical end 48 of the cam member 46 and be moved radially outwardly to its operative position, as illustrated in Fig. 4. This radial movement of the tool 32 moves the projecting portion 37 through the slot 62 of the gauge member 60 into the enlarged annular recess 20 of the mandrel 14 intermediate the top and bottom walls of the article 12. The tool is maintained in this position by the cam member 46 and, upon continued downward movement, the cutting edge 38 engages and chamfers the inner edge 10 of the recess 11 in the lower wall of the article 12. The cooperating cam member 46 will maintain the tool in its outer operative position against the stop screw 65 and will be forced downward with the downward movement of the tool 32 against the yielding action of the spring 55. The downward movement of the tool 32 will be arrested by the engagement of the stop surface 42 thereon with the lower wall of the article 12. If desired, an adjustable auxiliary stop 67, carried by the operating lever 24 and cooperating with a fixed stop member 68, may be used to arrest the downward movement of the arbor 27 at a predetermined position. Upon completion of the chamfering operation and the upward withdrawal of the arbor 27 from the article 12, the tool 32 will be returned to its normal inoperative position as it becomes disengaged from the conical end of the cam member 46 to permit its withdrawal through the aperture 11 in the upper wall of the article 12.

What is claimed is:

1. In an apparatus for chamfering an inner wall of an apertured hollow article, a recessed arbor, means for imparting rotary and axial movement to said arbor, a tool pivotally carried by said arbor and normally disposed in an inoperative position in the recess thereof, a support for supporting an apertured hollow article in the path of said arbor, a cam member mounted in the path of said arbor and independent thereof adapted to enter said recess and engage said tool to move said tool into an operative position, said tool having a cutting edge arranged to cut in response to an axial movement of said tool, and a stop surface on said tool for engaging said article to limit the axial movement of said tool.

2. In a chamfering apparatus, a slotted arbor, driving means for imparting rotary and axial movements to said arbor, a cutting tool mounted in the slot of said arbor, a spring for yieldingly retaining said tool in said slot, a cam member mounted coaxial with and independently of said arbor and adapted to enter said slot and engage said tool at a predetermined point in the movement of said arbor to move a part of said tool out of said slot, a stop on said arbor for limiting the outward movement of said tool, and means for yieldingly supporting said cam to permit axial movement thereof with said tool after it has moved said tool to its outer position.

3. In a chamfering apparatus, an arbor slotted intermediate its ends and capable of rotary and axial movements, a cylindrical aperture coaxial with the arbor and extending from the free end thereof into communication with the slot, a cutting tool mounted in the slot in said arbor, a spring for yieldingly retaining said tool in normal inoperative position in said slot, a cam member mounted coaxial with and independently of said arbor and adapted to enter said cylindrical aperture and having an annular cam surface adapted to engage said tool to move a part of said tool at a predetermined point in its axial movement out of said slot to an operative position, said cam having a cylindrical portion engageable with the walls of said cylindrical aperture to maintain the cam member in aligned relation with said arbor, means for yieldably supporting said cam member for predetermined axial movement whereby said member may be moved axially with said tool to maintain said tool in its operative position through a predetermined portion of its axial movement, and stop means for limiting the movement of said tool outwardly from said slot.

4. In a chamfering apparatus, a slotted arbor capable of rotary and axial movements, a cutting tool mounted in the slot in said arbor and movable from a normal inoperative position wholly within said slot to an operative position partly out of said slot, an abutment member in coaxial alignment with said arbor and independent thereof adapted to enter said slot therein, a cam surface on said tool engageable with said abutment member at a predetermined point of axial movement of said arbor for camming said tool into operative position, and means for yieldingly mounting said abutment member for axial movement whereby, after said tool has been moved to its operative position by the abutment, the abutment is movable axially with said tool and said arbor to maintain said tool in said operative position.

5. In an apparatus for chamfering an inner wall of an apertured hollow article, a slotted arbor, a tool pivotally carried by said arbor and having a cutting edge, a spring for yieldingly retaining said tool in a normal inoperative position in the slot in said arbor, driving means for imparting rotary and axial movement to said arbor, a support for supporting an apertured article in the path of said arbor, a cam surface on said tool, an axially movable member mounted independently of and in coaxial alignment with said arbor and adapted to enter said slot and engage the cam surface on said tool for effecting the movement of said tool to an operative position where the cutting edge thereof is outside of said slot and effective to engage the inner wall of said article, and means for mounting said member for axial movement with said tool while maintaining said tool in operative position.

6. In an apparatus for chamfering an inner wall of an apertured hollow article, a slotted arbor adapted for rotary and axial movements, a tool pivotally carried by said arbor and normally disposed in an inoperative position in the slot thereof, a support for supporting said apertured hollow article in the path of movement of said arbor, an abutment member independent of and in coxial alignment with said arbor, said abutment member being normally spaced from said arbor and adapted to enter said slot therein, a cam surface on said tool engageable with said abutment member at a predetermined point of axial movement of said arbor for camming said tool into operative position, means mounting said abutment for axial movement whereby said abutment may be moved axially with said tool while maintaining said tool in said operative position, said tool having a cutting edge arranged to cut in response to axial movement of said tool, and a stop member on said tool for engaging said article to limit the axial movement of said tool.

7. In an apparatus for chamfering an inner wall of an apertured hollow article, a slotted arbor capable of rotary and axial movements, a tool pivotally carried by said arbor and normally disposed in an inoperative position in the slot thereof, a spring for urging said tool to its normal inoperative position, a support for supporting said apertured hollow article in the path of said arbor, an annular gage member removably secured on said arbor and engageable in the aperture of said article for aligning said article relative to said arbor, a cam member mounted independently of and in the path of axial movement of said arbor and adapted to enter said slot and engage said tool at a predetermined position of the movement of said arbor to move said tool transversely to an operative position, means for mounting said cam member for axial movement with said arbor while maintaining said tool in said operative position, and adjustable means carried by said arbor for limiting the transverse movement of and determining the operative position of said tool.

8. In an apparatus for chamfering an inner wall of an apertured hollow article, a recessed arbor capable of rotary and axial movements, a tool pivotally carried by said arbor and normally disposed in an inoperative position in the recess thereof, a support for supporting an apertured hollow article in the path of said arbor, a cam member mounted in the path of said arbor and independent thereof adapted to enter said recess and engage said tool to move said tool into an operative position, said tool having a cutting edge arranged to cut in response to an axial movement of said tool, and a stop surface on said tool engageable with said article and operable to limit the axial movement of said tool.

9. In a chamfering apparatus, a slotted arbor, a cutting tool pivotally mounted in the slot in said arbor, spring means for yieldingly maintaining said tool in an inoperative position in said slot, a member disposed coaxially with and independently of said arbor and having a cam surface adapted to enter said slot and engage said tool at a predetermined point in the movement of said arbor to move said tool outwardly to an operative position, and means mounting said cam member for a predetermined axial movement whereby after said cam member has moved said tool outwardly to its operative position, said cam may move axially with said tool while maintaining it in its operative position for a predetermined portion of its axial movement.

10. In a chamfering apparatus, an apertured arbor capable of rotary and axial movements, a tool carried by said arbor and mounted for transverse movement in said recess from a normal inoperative position within said recess to an operative position partly out of said recess, an element independent of said arbor disposed in the path of axial movement of said arbor and adapted to enter the recess therein and to engage and move said tool to an operative position at a predetermined point in the axial movement of said arbor, and means mounting said element for axial movement with said tool while maintaining said tool in operative position.

ALEXANDER B. REEVES.

REFERENCES CITED

The following references are of record in the file of this patent:

UNITED STATES PATENTS

| Number | Name | Date |
|---|---|---|
| 1,183,240 | Ruthemeyer | May 16, 1916 |
| 1,674,863 | Jennings | June 26, 1928 |
| 1,817,668 | Bogart | Aug. 4, 1931 |
| 2,401,074 | Huelster | May 28, 1946 |